March 17, 1931.  M. GREEN  1,796,840

VALVE

Filed Nov. 17, 1927

INVENTOR
Menyhert Green
BY
Howard P. King
ATTORNEY

Patented Mar. 17, 1931

1,796,840

UNITED STATES PATENT OFFICE

MENYHERT GREEN, OF NEW YORK, N. Y.

VALVE

Application filed November 17, 1927. Serial No. 233,761.

This invention relates to valves, and more particularly to locking means for valves for preventing the inadvertent or accidental opening of the valve by brushing against it, or by the action of a child or an animal in attempting to turn the valve without knowledge of the consequences.

The objects of the invention are to provide a valve which will be very secure against unintentional, unwarranted manipulation; to provide a locking means which is operable separately from the operation of the valve so that releasing the lock will not turn on the valve except by separate manipulation; to minimize the exposed portions of the locking means both for the sake of appearance and avoiding collection of grease, dirt or dust; to avoid parts which rub on exposed portions of the valve to scratch or mar the same; to secure simplicity of construction and operation, and to obtain other advantages and results as may be brought out in the following description.

Referring to the accompanying drawing in which like numerals of reference indicate similar parts throughout the several views:—

Figure 1:
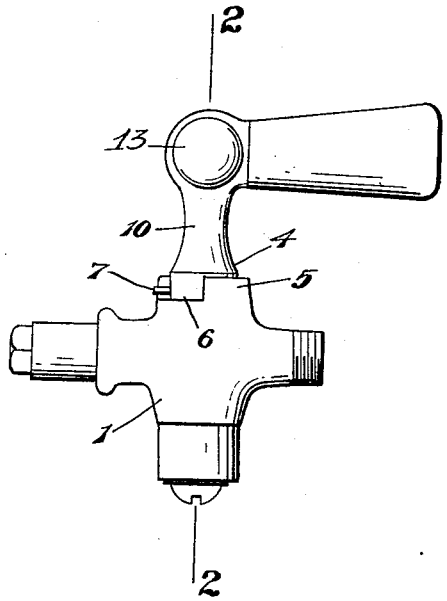
Figure 1 is a side elevation of my improved valve showing the same open.
Figure 2:
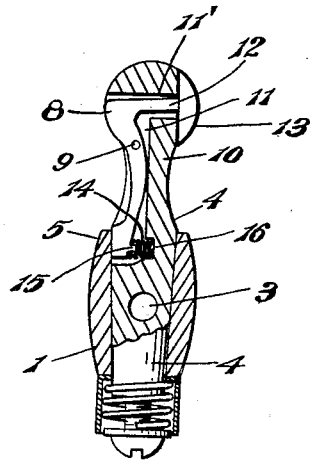
Figure 2 is a partly sectional view on line 2—2 of Fig. 1.
Figure 3:
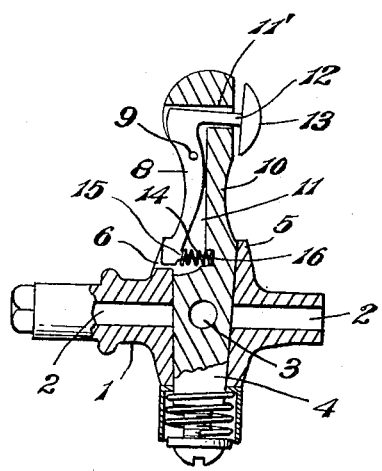
Figure 3 is a partly sectional view transverse to that of Fig. 2 or longitudinally of the valve in the plane of Fig. 1 with the valve shut off and the locking mechanism in operative position to prevent turning the valve.

In the specific embodiment of the invention, I have shown a body portion 1 having the usual longitudinal passage 2 for the gas which includes also a passage 3 transversely through a partially rotatable plug 4, so as when the plug is turned in an open position its passage 3 is in alinement with the passage 2 of the body portion, but when the plug is rotated to what may be called the closed position, its passage is turned out of registration with the passage of the body portion and accordingly flow of fluid through the valve is prevented. In the construction of valves of this sort, it is usual to provide a collar 5 at the top of the body portion and around the plug, this collar being cut away as at 6, providing a notch within which a stop pin 7 may have limited travel from end to end thereof. It is to be understood that this stop pin 7 is fast with respect to the plug and projects laterally therefrom, and as the plug is rotated, said pin will engage one end or the other of the notch, and thus limit the amount which the plug may be turned. Usually this limitation is confined to a quarter turn.

The locking means in which the present invention inheres more particularly, preferably comprises a first class lever 8 pivoted, as at 9, within the stem 10 of the rotatable valve plug. This lever is preferably positioned and shaped so that its outer edge will be flush with the stem of the plug in one or the other of its positions. That it is to say, the upper portion of the lever will be flush with the stem when the device is in unlocked position, and the portion of the lever below its point of pivoting as far as the collar will be flush with the outer surface of the stem while the device is in locked position. This construction enables the device to avoid projecting parts which are likely to be hit, bent or broken or be in the way when the valve is being cleaned, and also the fact that the lever is flush with the surface throughout its exposed length at one time or another, prevents the collection of grease, dirt and dust. It is to be understood that an appropriate slot 11 is cut inwardly from the side of the post or plug for the reception of said lever, and in the head of the plug I preferably drill or provide a hole 11' through the same to the opposite side of the head from the said slot. The lever preferably has an extension 12 which projects through said hole by which the lever may be pressed outwardly at its upper end. For the sake of appearance and ease of manipulation, a suitable button 13 may be provided on the projecting end of said lever extension 12. The lower end of said lever is arranged to extend below the top of the collar and adapted to be depressed in unlocked position so as to be flush with the inside wall of the collar and right behind the collar after being depressed and the plug turned. However, when the plug is brought back again so the slot passes out beyond the end of the notch, the lower end of said lever may swing outward and thus be in lateral engagement with the end of said notch when it is attempted to again turn the plug. The lever will thus prevent the turning of the plug in one direction and the pin 7 will prevent the plug from turning in the other direction, thus locking the same against inadvertent manipulation.

In order that the device may operate to lock closed automatically, the registration of the slot in the plug with the end portion of the notch in the collar is arranged to take place when the fluid passages are out of registration, and a spring 14 is provided to impel the lower end of the lever normally outward so that it will snap into locking position and remain there while the plug is turned to its shut off position and until the lever is positively pressed. Preferably the lower end of the lever provides a boss 15 which will enter the end of the spring for holding it in position, and the plug is provided with a depression 16 for the same purpose. It is to be particularly noted that in the operation of my device there are no parts of the locking mechanism which slide upon an exposed part of the valve. The lower end of the lever rides behind the collar so there is no scratching of the valve nor unnecessarily projecting parts which add to the possibility of damage or disfiguration.

Obviously detail changes and modifications may be made in the construction and use of my improved valve, and I do not wish to be understood as limiting myself to the exact structure shown or described, except as set forth in the following claims when construed in the light of the prior art.

Having thus described my invention, I claim:—

1. A valve comprising in combination with a body portion having a collar partially cut away to provide a notch, a plug adapted to be rotated for opening and closing the valve, said plug having a longitudinal slot, a lever pivoted with its major portion in said slot and having its outer longitudinal edge substantially flush with the plug in locking position of the plug and having an end adapted to project from the plug into said notch of the collar in the shut off position of the plug, said lever being adapted to be depressed in order to ride behind said collar when it is desired to rotate said plug to open position of the valve.

2. A valve comprising in combination with a body portion having a collar partially cut away to provide a notch, a plug adapted to be rotated for opening and closing the valve, a lever having a point of pivoting in said plug at a distance from said collar and having an end lip thereon projecting therefrom adapted to enter said notch of the collar in shut off position of the plug, said lip adapted to be retracted into the plug in order to ride behind said collar when it is desired to rotate said plug to open position of the valve, and said lever being arranged so that its outer edge will always be non-projecting from said plug and will be flush with the outer surface of the plug from the point of pivoting to said lip when said lip projects from the plug.

3. A valve comprising in combination with a body portion having a collar cut away in part to provide a notch, a plug adapted to be rotated for opening and closing the valve, a lever of the first class having a point of pivoting in said plug at a distance from said collar and having an end lip thereon projecting therefrom adapted to enter said notch of the collar in shut off position of the plug, said lip adapted to be retracted into the plug in order to ride behind said collar when it is desired to rotate said plug to open position of the valve, the remainder of said lever at the side of the plug from which said lip projects being entirely within the plug in either position of the lever and arranged so that a substantial portion of its outer longitudinal edge will be flush with the outer surface of said plug in one of its swung positions.

4. A valve comprising in combination with a body portion having a collar cut away in part to provide a notch, a plug adapted to be rotated for opening and closing the valve, a lever of the first class having a point of pivoting in said plug at a distance from said collar and having an end lip thereon projecting therefrom adapted to enter said notch of the collar in shut off position of the plug, said lip adapted to be retracted into the plug in order to ride behind said collar when it is desired to rotate said plug to open position of the valve, the remainder of said lever at the side of the plug from which said lip projects being entirely within the plug in either position of the lever and arranged so its outer edge below the point of pivoting will be flush with the outer surface of the plug when the lever is in one position and the outer edge of the lever above the point of pivoting will be flush with the outer surface of the plug when the lever is in its other position.

5. A valve comprising in combination with a body portion having a collar cut away in part to provide a notch, a plug adapted to be rotated for opening and closing the valve, said plug having a head and laterally projecting handle for turning said plug, a lever of the first class having a point of pivoting in said plug at a distance both from said collar and said head between the same, said lever pivoted to swing in a plane perpendicular to said handle, the lower end of said lever being next the collar and having a lip adapted to enter said notch of the collar in shut off position and the upper end of said lever having a lateral extension passing through said head, a button on the end of said extension on the opposite side of the head from said lip to control the lever from the opposite side of the plug from which it locks when moved in a direction toward the axis of rotation of the plug.

6. A valve comprising in combination with a body portion having a collar cut away in part to provide a notch, a plug adapted to be rotated for opening and closing the valve, said plug having a head and laterally projecting handle for turning said plug, a lever of the first class having a point of pivoting in said plug at a distance both from said collar and said head between the same, said lever pivoted to swing in a plane perpendicular to said handle, the lower end of said lever being next the collar and having a lip adapted to enter said notch of the collar in shut off position and the upper end of said lever having a lateral extension passing through said head, a button on the end of said extension adapted to abut the head at one side and the other side of said button forming a continuation of the surface of the head when said other side is abutting the head.

7. A valve comprising in combination with a body portion having a collar partially cut away to provide a notch, a plug adapted to be rotated for opening and closing the valve, said plug having a longitudinal slot therein and having a head with said slot extending from within said head to the collar of the body portion, a handle projecting laterally from said head perpendicular to the general plane of said slot, said handle adapted to rotate the plug on its longitudinal axis, a lever of the first class arranged within said slot, said lever having a point of pivoting in said plug at a distance both from said collar and said head between the same, whereby said lever may swing in said slot in a plane perpendicular to the handle, said lever having a lip thereon projecting therefrom and adapted to enter said notch of the collar in shut off position of the plug, said lip being positioned at the bottom end of said lever and adapted to be retracted into the plug in order to ride behind said collar when it is desired to rotate said plug to open position of the valve, and said lever being arranged so that its outer edge on the side of the plug having the slot will be entirely within the plug in either position of the lever from said head to said lip and arranged so its said outer edge below the point of pivoting will be flush with the outer surface of the plug when the lever is in one position and the said outer edge of the lever above the point of pivoting will be flush with the outer surface of the plug when the lever is in its other position, the end of said lever in the said head having a lateral extension through said head to the side thereof opposite said slot, and a button on the end of said extension adapted to abut the head at one side and the other side of said button forming a continuation of the surface of the head when said other side is abutting the head.

MENYHERT GREEN.